A. B. WAKEFIELD & B. A. BERRYMAN.
Car-Wheels.
No. 137,266.
Patented March 25, 1873.
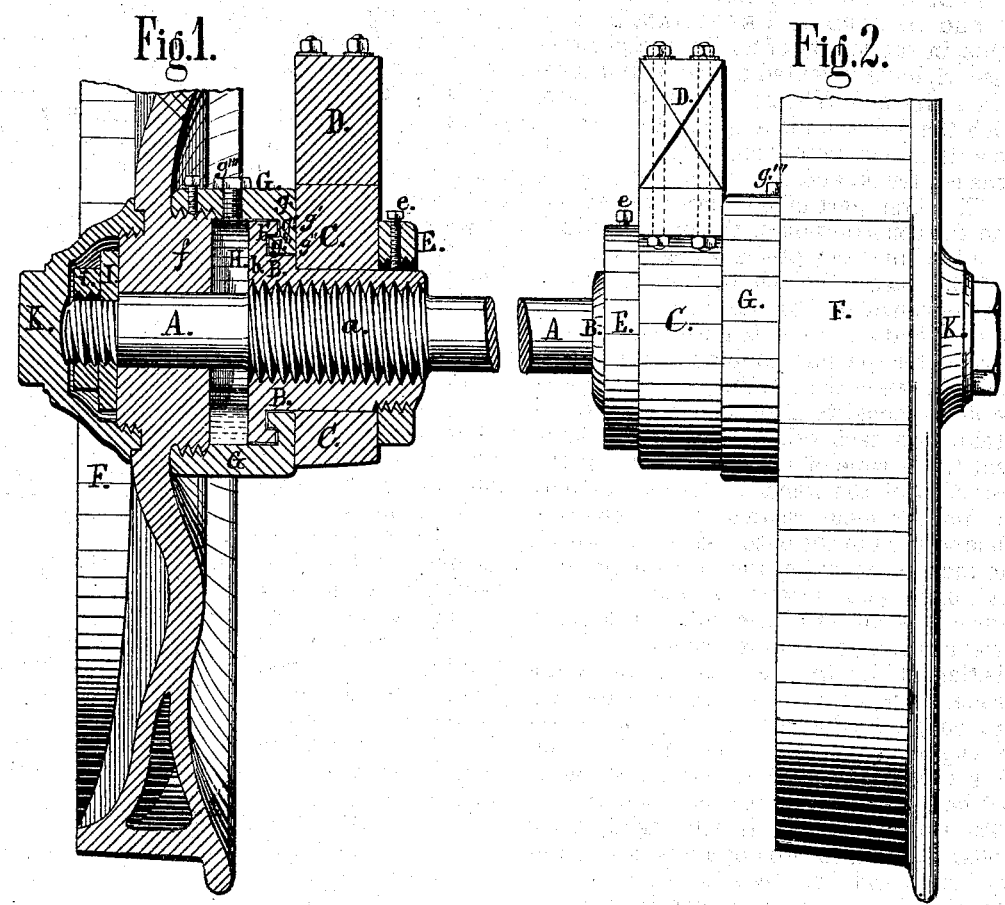
ATTEST:
Jas. L. Ewin
Walter Allen
INVENTORS:
Alanson B. Wakefield.
Bayard A. Berryman.
By Knight Bro. Attys.

UNITED STATES PATENT OFFICE.

ALANSON B. WAKEFIELD AND BAYARD A. BERRYMAN, OF ST. LOUIS, MO.

IMPROVEMENT IN CAR-WHEELS.

Specification forming part of Letters Patent No. 137,266, dated March 25, 1873.

*To all whom it may concern:*

Be it known that we, ALANSON B. WAKEFIELD and BAYARD A. BERRYMAN, both of St. Louis, in the county of St. Louis and State of Missouri, have invented a certain Improvement in Axles and Wheels for Railway Cars, of which the following is a specification:

The axle in our improvement is fixed rigidly to the car-truck, and the wheel turns on the axle. The first part of our improvement relates to the construction of the oil-box, which is set on the inner side of the wheel, and a portion of the case of which rotates therewith while a portion of said case is rigidly attached to the axle, and has upon its upper side a bearing-surface for the side timbers of the truck. The joint between the rotating and fixed parts of the oil-box consists of annular angle-flanges that take into each other, as shown, so as to prevent the escape of oil while allowing the free rotation of the wheel. The second part of our improvement relates to a screw-cap, which is secured to the outer side of the wheel-hub to inclose the end of the axle and prevent the exit of oil and entrance of dust.

Figure 1 is an axial section, and Fig. 2 a side elevation, of our improvement.

A is the axle having rigid connection to the car-truck. $a$ is a screw-threaded portion carrying a collar, B, that has at one end an annular angle-flange, $b\ b'$. Upon the fixed collar B is a bearing-collar, C, having a flat or ribbed bearing, $c$, at top for the truck-timber D. The bearing-collar C is held rigidly upon the collar B, and is secured by a nut, E, screwed on the latter, and held by a key or set-screw, $e$. F is the wheel upon the inner side of whose hub $f$ screws the outer or main part G of the oil-box. The end $g$ of the case G fits upon the collar B, and has an annular angle-flange, $g'\ g''$, taking into that $b\ b'$ in such manner as to turn freely, but yet to prevent undue escape of oil from the oil-chamber H. The oil-chamber is formed by the inner surface of the hub $f$, the case G, and the annular angle-flanges $b\ b'$ and $g'\ g''$. $g'''$ is a screw-plug to the oil-hole. I is a non-rotating washer on the end of the axle, held in place by a nut, $i$. K is a cap, screwing onto the outer part of the hub $f$, and preventing the exit of oil and entrance of dust. The chamber H may contain sufficient oil for its surface-height to be level with the lower part of the flange $g''$, as shown, or may contain more or less.

As the wheel turns the centrifugal force will carry the oil to the periphery of the chamber, and when the wheel stops the oil will flow down over the axle and lubricate the wheel and the joint $b\ b'\ g'\ g''$.

We claim as our invention—

1. The oil-chamber, consisting of the fi members A B and rotating members G $f$ connected by a coupling, $b\ b'\ g'\ g''$, substantially as and for the purpose set forth.

2. The combination of the axle A, collar B, bearing-collar C, case G, and wheel F with the truck-frame D, substantially as and for the purposes set forth.

3. The combination of the axle A, collar B, case G, wheel F, and cap K, substantially as and for the purposes set forth.

ALANSON B. WAKEFIELD.
BAYARD A. BERRYMAN.

Witnesses:
SAML. KNIGHT,
EDWARD B. COOPER.